United States Patent

Wang

[11] Patent Number: 6,128,744
[45] Date of Patent: Oct. 3, 2000

[54] COMPUTER STARTER AND STARTING METHOD FOR AN ATX COMPUTER SYSTEM

[75] Inventor: Cheng-Chih Wang, Hsinchu Hsien, Taiwan

[73] Assignee: Winbond Electronics Corp., Hsinchu, Taiwan

[21] Appl. No.: 09/210,574

[22] Filed: Dec. 14, 1998

[30] Foreign Application Priority Data

Oct. 29, 1998 [TW] Taiwan ............................. 87118001

[51] Int. Cl.[7] .................. G06F 1/26; G06F 12/14; H04L 9/32; H04L 9/00
[52] U.S. Cl. .................. 713/300; 713/330; 713/202; 235/380; 340/825.34; 902/26; 710/73
[58] Field of Search .................. 713/300, 310, 713/330, 200, 202; 710/102, 73; 711/102; 235/382, 380, 435; 340/825.31, 825.34, 825.3; 902/26

[56] References Cited

U.S. PATENT DOCUMENTS

| | | |
|---|---|---|
| 4,752,677 | 6/1988 | Nakano et al. . |
| 5,841,868 | 11/1998 | Helbig, Sr. . |
| 5,877,483 | 3/1999 | Bilich et al. . |
| 5,911,080 | 6/1999 | Yeom . |

*Primary Examiner*—Gopal C. Ray
*Attorney, Agent, or Firm*—Nath & Associates; Harold L. Novick

[57] ABSTRACT

A computer starter and starting method for an ATX computer system which provides a standby voltage when the computer system is shut down. The computer starter takes the standby signal as its power supply and includes a smart card interface, a clock generator, a non-volatile memory, a micro-controller and a power control circuit. The smart card interface generates an enable signal upon insertion of a smart card. The clock generator generates a reference clock in response to the enable signal. The non-volatile memory stores a computer identification signal. The micro-controller resets the smart card, reads a user identification signal stored in the smart card, and generates a verification signal when the computer identification signal stored in the non-volatile memory matches the user identification signal stored in the smart card. The power control circuit generates a start signal in response to the verification signal so as to start the computer system.

16 Claims, 1 Drawing Sheet

COMPUTER STARTER AND STARTING METHOD FOR AN ATX COMPUTER SYSTEM

BACKGROUND OF THE INVENTION

1. Field of the Invention

The present invention relates to a computer starter and a starting method for an ATX computer system capable of turning on the computer system upon insertion of a smart card, protecting data stored therein by the performance of a verification procedure, and selectively blocking a start signal from an external panel under certain situations.

2. Description of the Related Art

A typical microprocessor-cored computer system, such as a personal computer or a workstation computer, is turned on and off by a switch device that mechanically connects/disconnects a power supply of the computer system to/from an external voltage source, such as AC 110V. When the switch device is open, the power supply is disconnected from the external voltage source, and the computer system is turned off. On the contrary, when the switch device is closed, the power supply is connected to the external voltage source and transforms the external voltage into a predetermined DC level, such as ±5V and ±12V, and the computer system is turned on to perform various programs and functions.

However, such a mechanical switch device relies on human hands to turn the computer system on or off, so the computer system can not be turned on or off when no one is present. Further, once the mechanical switch device is closed, the computer system directly enters into a start procedure. As a result, the computer system is vulnerable to unauthorized access if there is no verification procedure performed by BIOS firmware or OS-level software. That is, anyone who is close to the computer system can easily steal the data stored in the computer system.

A Macintosh personal computer system manufactured by Apple Computer Inc., Cupertino, Calif. is designed in a manner that the computer system can be turned on or off by predetermined keys on a keyboard. This is an easy way to turn the computer system on or off; however, the data stored in the computer system are still as unprotected as in conventional computer systems. In this case, the computer system continues to monitor the keyboard and enables a power supply of the computer system when a start signal is detected, i.e., when the predetermined keys are pressed. This is so-called soft power control, in which anyone can press the predetermined keys to turn the computer system on or off and freely access the data stored therein. To increase data security, BIOS firmware or OS-level software is also needed.

Intel Corporation, Santa Clara, Calif. provides an ATX specification for personal computer systems in which a power supply is controlled not only by two states (open and closed) of a mechanical switch device, but also by an internal chipset. This is another soft power control, whereby the computer system can be turned on or off by both a mechanical switch and an internal chipset.

For ATX specification version 2.01, a computer system will keep a standby voltage of 5V even after the computer system is turned off. The standby voltage is a DC voltage, which can provide a maximum current of 0.7 A to drive a power control circuit of the computer system when the computer system is turned off. The power control circuit can be preset for ease of operation and various functions in a manner that, for example, the computer system can automatically fax documents at predetermined time at night to reduce telephone cost, the computer system can be automatically triggered by a modem call to receive incoming e-mails and files, . . . and so on.

However, the ATX computer system also does not provide any verification procedure to protect data stored therein. Therefore, anyone who presses a power switch can still drive the power supply and turn on the computer system. As a result, BIOS firmware or OS-level software is also needed to perform a verification procedure and stop anyone without a password.

Once BIOS firmware or OS-level software are provided in the ATX computer system to perform a verification procedure, any unauthorized person may repeatedly turn the power supply of the computer system on and off to try out a password. This is because BIOS firmware or OS-level software only accepts a limited number of successive passwords and will lock if all these passwords are wrong. Thus, the unauthorized person must reset the power supply to try more passwords.

However, as known by a person skilled with computers, the power supply will likely be destroyed after being repeatedly turned on and off. Although a well-designed power supply is often provided with a protective circuit, abnormal operations such as being repeatedly turned on and off still have a negative impact on the peripherals, such as a hard disc or a CD-ROM.

SUMMARY OF THE INVENTION

Therefore, it is an object of the present invention to provide a computer starter and a starting method for an ATX computer system that can turn on the computer system upon insertion of a smart card and block a start signal from an external panel under certain situations so as to protect the data stored therein.

It is another object of the present invention to provide a computer starter and a starting method for an ATX computer system that uses a standby voltage provided when the ATX computer system is turned off as a voltage source of the computer starter so as to drive a power supply of the computer system.

It is another object of the present invention to provide a computer starter and a starting method for an ATX computer system in which a smart card is provided to store a user identification signal (including an identity and a corresponding password for a user), and the power control circuit is activated upon insertion of the smart card (rather than input from the keyboard). Further, the computer system may store several identities and corresponding passwords, so the system can be shared by different users.

It is another object of the present invention to provide a computer starter and a starting method for an ATX computer system in which the power control circuit can be controlled to accept a start signal from the smart card and block start signals from an external panel. Thus, the data stored in the computer system can be protected and unauthorized persons can be stopped from repeatedly turning the computer system on and off and destroying the peripherals due to abnormal operations.

To realize the above and other objects, the present invention provides a computer starter for an ATX computer system which uses a standby voltage provided when the computer system is turned off as its power supply. The computer starter includes an IC card interface, a clock generator, a memory, a micro-controller and a power control circuit. The IC card interface is used to generate an enable signal upon insertion of an IC card. The clock generator is used to generate a reference clock in response to the enable signal. The memory is used to store a computer identification signal. The micro-controller is used to reset the IC card, read a user identification signal stored in the IC card, and generate a verification signal when the computer identification signal matches the user identification signal. The power control circuit is used to generate a start signal in response to the verification signal so as to turn the computer system on. Therefore, the micro-controller can be triggered by the insertion of the smart card, and the power control circuit can be used to drive on the computer.

According to the present invention, when the computer system is turned off, the standby voltage is used as the voltage source of the power control circuit to drive a power supply of the computer system and the peripherals, such as a hard disc and a CD-ROM.

Further, according to the present invention, the smart card interface can be a card reader or other apparatus. A predetermined identification signal including an identity and a corresponding password for a user is stored in the non-volatile memory, which can be accessed by a CPU of the computer system. The power control circuit can also selectively receive a start signal from an external panel so as to turn on the computer system.

Further, according to the present invention, the power control circuit can be controlled by the CPU of the computer system, only accepting the verification signal from the micro-controller and blocking the start signal from the external panel under certain situations. Thus, the data security can be increased and destruction of the peripherals due to abnormal operations prevented.

Further, according to the present invention, the start signal of the power control circuit can be directly outputted to control a power supply of the computer system, or indirectly used to control the power supply through an internal chipset.

The present invention also provides a starting method for an ATX computer system that provides a standby voltage when the computer system is shut down. This method includes the steps of generating an enable signal upon insertion of an smart card; generating a reference clock in response to the enable signal; providing a memory to store a computer identification signal; providing a micro-controller to reset the smart card, read a user identification signal stored in the smart card, and generate a verification signal when the computer identification signal matches the user identification signal; and providing a power control circuit to output a start signal in response to the verification signal so as to start the computer system.

BREIF DESCRIPTION OF THE DRAWINGS

Further objects, features and advantages of the present invention will become apparent from the following detailed description of a preferred embodiment of the invention with reference to the accompanying drawings.

FIG. 1 is a block diagram showing a computer starter for an ATX computer system according to the present invention.

DETAILED DESCRIPTION OF THE PREFERRED EBODIMENT

Figure 1:
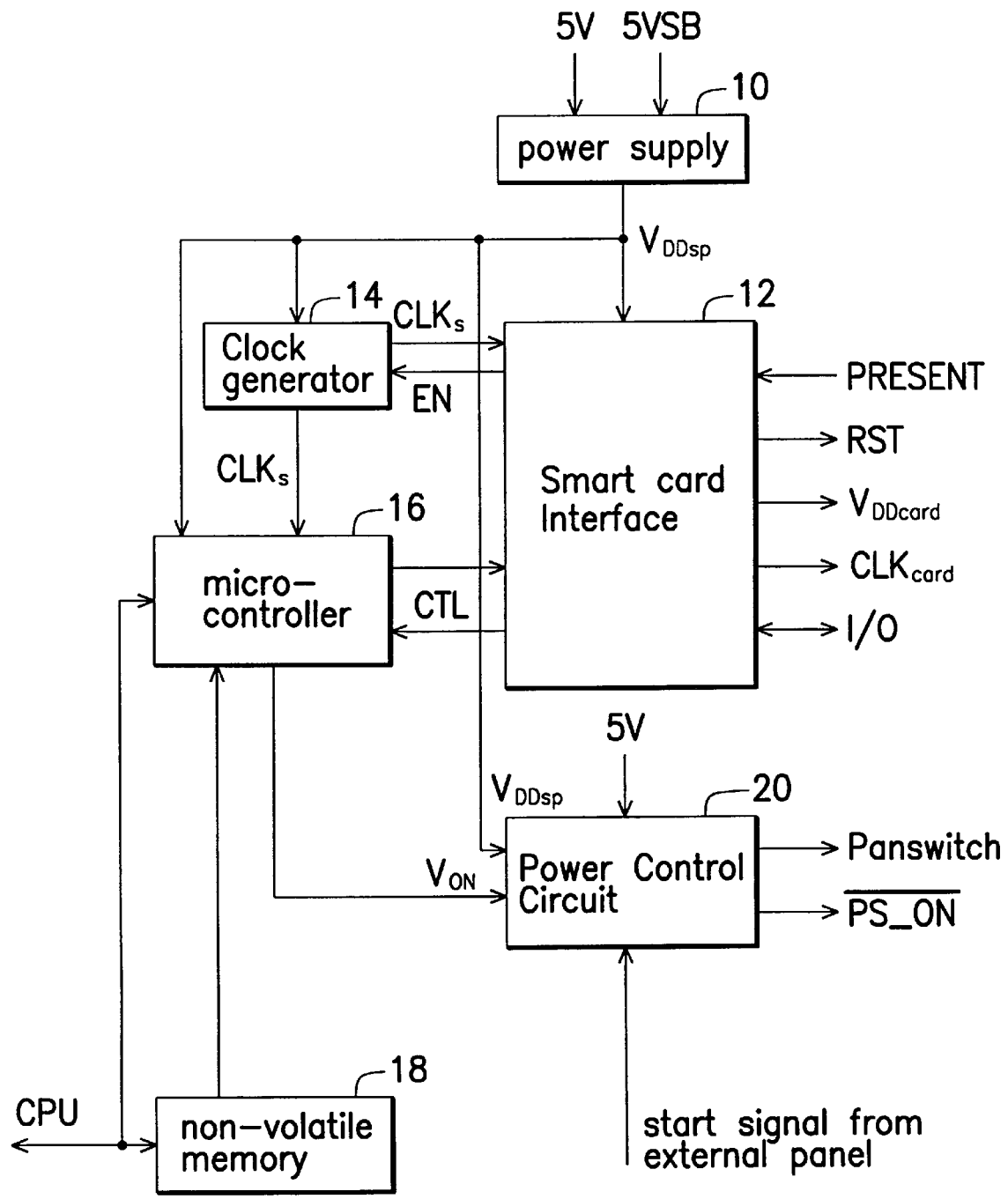

In order to turn on the ATX computer system upon insertion of a smart card, allowing the sharing the computer system among different users while increasing data security, the computer starter of the present invention uses a standby voltage provided when the computer system is turned off as a voltage source. For example, the computer system under ATX Specification Version 2.01 provided by Intel Corporation will keep a standby voltage of –5V, which can provide a maximum current of 0.7 A.

FIG. 1 is a block diagram showing a computer starter for an ATX computer system according to the present invention.

As shown in FIG. 1, the computer starter includes a power supply 10, a smart card interface 12, a clock generator 14, a micro-controller 16, a non-volatile memory 18 and a power control circuit 20.

The power supply 10 is used to provide a standby voltage 5VSB when the computer system is turned off. In this embodiment, the power supply 10 is similar to a switch device. When the computer system is turned on, the power supply 10 provides a normal voltage (5V) as a voltage source of the computer system and the peripherals ($V_{DDSP}$). On the contrary, when the computer system is turned off, the power supply 10 provides a standby voltage (5VSB) as a voltage source of the computer starter. The standby voltage is a DC voltage of 5V in ATX specification version 2.01, as mentioned above.

The smart card interface 12 generates an enable signal (ENc) upon insertion of a smart card (not shown). In this embodiment, the smart card interface 12 can be a card reader or other apparatus. When the smart card is inserted into the smart card interface 12, a PRESENT signal is activated to generate an enable signal (ENc) and inform the computer system and peripherals. Then, the clock generator 14 is driven by the enable signal (ENc) to output a reference clock (CLKS) for the computer system, and the micro-controller 16 is driven by the reference clock (CLKS) to output a control signal (CTL) to read out the user identification signal stored in the smart card. The user identification includes at least an identity and a corresponding password for a user.

In the non-volatile memory 18 is stored a computer identification signal. In this embodiment, the non-volatile memory 18 can be a flash memory or other memory that can store data permanently. The computer identification signal includes at least an identity and a corresponding password for a user. Generally, the non-volatile memory 18 is accessed (changed) by the CPU of the computer system under different situations. Further, in order to share the computer system among different users, the computer system can store identities and corresponding passwords for other users.

Further, the clock generator 14 is provided to generate a reference clock (CLKS) in response to the enable signal (ENc) generated when the smart card is inserted. The micro-controller 16 is then driven by the reference clock (CLKS) to output a reset signal (RST), a power voltage ($V_{DDCARD}$), a clock signal ($CLK_{CARD}$) and I/O signals through the smart card interface 12. The reset signal (RST), the power voltage ($V_{DDCARD}$), the clock signal ($CLK_{CARD}$) and the I/O signals are usually used to reset the smart card, read the user identification signal stored in the smart card, and output a verification signal ($V_{ON}$) when the computer identification signal stored in the non-volatile memory matches the user identification signal stored in the smart card.

The power control circuit 20 is provided to output a start signal (PS_ON or Panswitch_ON) in response to the verification signal ($V_{ON}$) derived from the micro-controller 16. In this embodiment, the start signal (PS_ON) of the power control circuit 20 can be directly outputted to control the power supply 10 of the computer system, or the start signal (Panswitch_ON) can be indirectly used to control the power supply 10 through an internal chipset (not shown). Further, the power control circuit 20 can selectively receive another start signal from an external panel, or can be controlled by the CPU of the computer system to only accept the verification signal ($V_{ON}$) from the micro-controller and block the start signal provided from the external panel under certain situations. Thus, unauthorized persons can be stopped from repeatedly turning the computer system on and off.

In summation, the computer starter and the starting method for an ATX computer system according to the present invention can turn on the computer system upon insertion of a smart card and block a start signal from an external panel under certain situations so as to protect the data stored therein.

The computer starter and the starting method for an ATX computer system according to the present invention can also use a standby voltage provided when the computer system is turned off as a voltage source of the computer starter so as to drive a power supply of the ATX computer system.

Further, in the computer starter and the starting method for an ATX computer system according to the present invention, a user identification including an identity and a corresponding password for a user is stored in a smart card, and the power control circuit is activated upon insertion of said smart card rather than input from the keyboard. Further, the computer system can store several identities and corresponding passwords in the non-volatile memory, so as to allow the sharing of the computer system between different users.

Further, in the computer starter and the starting method for an ATX computer system according to the present invention, the power control circuit can be controlled to only accept the verification signal from the micro-controller, blocking other start signal from an external panel. Thus, the data stored in the computer system can be protected, unauthorized persons can be stopped from repeatedly turning the computer system on and off, and destruction of the peripherals due to abnormal operations can be eliminated.

It should be understood that the present invention is not limited to the preferred embodiment as disclosed above. Variations and modifications can be made by those who are skillful in the art without departing from the spirit and scope of the present invention as defined in the appended claims. Thus, this invention is not to be limited to the disclosed embodiment except as required by the appended claims.

What is claimed is:

1. A computer starter for an ATX computer system which provides a standby voltage when the computer system is turned off, comprising:
   an IC card interface for generating an enable signal upon insertion of an IC card;
   a clock generator for generating a reference clock in response to the enable signal;
   a memory for storing a computer identification signal;
   a micro-controller for resetting the IC card, reading a user identification signal stored in the IC card, and generating a verification signal when the computer identification signal matches the user identification signal; and
   a power control circuit for generating a start signal in response to the verification signal so as to turn the computer system on.

2. The computer starter as claimed in claim 1, wherein the IC card interface is a card reader.

3. The computer starter as claimed in claim 1, wherein the memory is a non-volatile memory.

4. The computer starter as claimed in claim 1, wherein the computer identification signal is accessed by a CPU of the computer system.

5. The computer starter as claimed in claim 4, wherein the computer identification signal stored in the memory comprises at least an identity and a corresponding password for a user.

6. The computer starter as claimed in claim 4, wherein the power control circuit generates the start signal in response to the verification signal provided from the micro-controller or another start signal provided from an external panel.

7. The computer starter as claimed in claim 6, wherein the power control circuit is controlled by the CPU of the computer system, which accepting only the verification signal provided from the micro-controller and blocking the start signal provided from the external panel under certain situations.

8. The computer starter as claimed in claim 6, wherein the start signal provided from the power control circuit is directly used to control a power supply of the computer system, or indirectly used to control the power supply through an internal chipset.

9. A method to turn on an ATX computer system which provides a standby voltage when the computer system is turned off, comprising:
   generating an enable signal upon insertion of an IC card;
   generating a reference clock in response to the enable signal;
   providing a memory to store a computer identification signal;
   providing a micro-controller to reset the IC card, reading a user identification signal stored in the IC card, and generating a verification signal when the computer identification signal matches the user identification signal; and
   providing a power control circuit to output a start signal in response to the verification signal so as to start the computer system.

10. The method to turn on the ATX computer system as claimed in claim 9, wherein the IC card is inserted into an card reader to generate the enable signal.

11. The method to turn on the ATX computer system as claimed in claim 9, wherein the memory is a non-volatile memory.

12. The method to turn on the ATX computer system as claimed in claim 9, wherein the computer identification signal is accessed by a CPU of the computer system.

13. The method to turn on the ATX computer system as claimed in claim 12, wherein the computer identification comprises at least an identity and a corresponding password for a user.

14. The method to turn on the ATX computer system as claimed in claim 12, wherein the power control circuit generates the start signal in response to the verification signal provided from the micro-controller or another start signal provided from an external panel.

15. The method to turn on the ATX computer as claimed in claim 14, wherein the power control circuit is controlled by the CPU of the computer system, accepting only the verification signal provided from the micro-controller and blocking the start signal provided from the external panel under certain situations.

16. The method to turn on the ATX computer system as claimed in claim 14, wherein the start signal of the power control circuit is directly used to control a power supply of the computer system, or indirectly used to control the power supply through an internal chipset.

* * * * *